United States Patent
Xie et al.

(10) Patent No.: US 11,391,348 B2
(45) Date of Patent: Jul. 19, 2022

(54) TRANSMISSION AND POWER SYSTEM FOR USE IN HYBRID VEHICLE

(71) Applicants: NINGBO UMD AUTOMATIC TRANSMISSION CO., LTD, Ningbo (CN); ZHEJIANG GEELY HOLDING GROUP CO., LTD, Hangzhou (CN)

(72) Inventors: Weiqian Xie, Ningbo (CN); Lin Zhu, Ningbo (CN)

(73) Assignees: NINGBO UMD AUTOMATIC TRANSMISSION CO., LTD, Ningbo (CN); ZHEJIANG GEELY HOLDING GROUP CO., LTD, Hangzhou (CN)

(*) Notice: Subject to any disclaimer, the term of this patent is extended or adjusted under 35 U.S.C. 154(b) by 0 days.

(21) Appl. No.: 17/191,679

(22) Filed: Mar. 3, 2021

(65) Prior Publication Data

US 2021/0199179 A1 Jul. 1, 2021

Related U.S. Application Data

(63) Continuation-in-part of application No. PCT/CN2019/078179, filed on Mar. 14, 2019.

(30) Foreign Application Priority Data

Sep. 4, 2018 (CN) .......................... 201811027469.9
Sep. 4, 2018 (CN) .......................... 201821441471.6

(51) Int. Cl.
*F16H 3/72* (2006.01)
*F16H 3/00* (2006.01)

(52) U.S. Cl.
CPC ............. *F16H 3/006* (2013.01); *F16H 3/727* (2013.01); *F16H 2003/007* (2013.01); *F16H 2200/2007* (2013.01); *F16H 2200/2038* (2013.01)

(58) Field of Classification Search
CPC .......... B60K 6/00–547; B60K 1/00–02; F16H 3/72–728; F16H 2200/202–2028; F16H 2200/2035–2061; F16H 3/46; F16H 3/62
See application file for complete search history.

(56) References Cited

U.S. PATENT DOCUMENTS 5,823,281 A * 10/1998 Yamaguchi ............. B60L 50/16
903/914
6,905,434 B2 * 6/2005 Sugihara ................. F16H 3/663
475/342

(Continued)

FOREIGN PATENT DOCUMENTS

CN 103057395 A * 4/2013
CN 104154191 A 11/2014

(Continued)

*Primary Examiner* — David R Morris
*Assistant Examiner* — Lillian T Nguyen
(74) *Attorney, Agent, or Firm* — Andrew C. Cheng

(57) ABSTRACT

A transmission and a power system for use in a hybrid vehicle. A first ring gear or a first planetary frame is drivingly connected with an output gear of the transmission to serve as an output member, when either the first ring gear or the first planetary frame is drivingly connected with the output gear, the other one is connected with a casing of the transmission via a brake. A second clutch is configured as: when the brake is disengaged, the second clutch is engaged to make the rotational speed of the output member equal to the rotational speed of an input shaft. The transmission and the power system are structurally compact, work steadily, and effectively increase the acceleration performance of the hybrid vehicle.

14 Claims, 5 Drawing Sheets

(56) References Cited

U.S. PATENT DOCUMENTS

| | | | | |
|---|---|---|---|---|
| 2006/0111213 A1* | 5/2006 | Bucknor | ............... | B60L 50/61 |
| | | | | 475/5 |
| 2007/0111837 A1* | 5/2007 | Raghavan | ............. | B60K 6/445 |
| | | | | 475/5 |
| 2007/0161453 A1* | 7/2007 | Iwasaki | .................... | F16H 3/66 |
| | | | | 475/280 |
| 2008/0207372 A1* | 8/2008 | Holmes | ................. | F16H 3/728 |
| | | | | 475/5 |
| 2008/0207383 A1* | 8/2008 | Kato | ....................... | F16H 3/66 |
| | | | | 475/276 |
| 2011/0027105 A1* | 2/2011 | Haupt | ............... | F16H 61/0025 |
| | | | | 417/326 |
| 2011/0256974 A1* | 10/2011 | Okuwaki | ................ | B60K 6/44 |
| | | | | 475/5 |
| 2015/0167808 A1* | 6/2015 | Kim | ..................... | B60K 6/365 |
| | | | | 475/5 |

FOREIGN PATENT DOCUMENTS

| | | | | |
|---|---|---|---|---|
| CN | 106864248 | A | 6/2017 | |
| CN | 107791822 | U | 3/2018 | |
| CN | 107825953 | A | 3/2018 | |
| CN | 109130830 | A | 1/2019 | |
| DE | 102006037577 | A | 2/2008 | |
| JP | 2008149908 | A | 7/2008 | |
| JP | 2010513107 | A | 4/2010 | |
| WO | WO-2013146029 | A1 * | 10/2013 | ............. F16H 3/66 |
| WO | 2016134713 | A1 | 9/2016 | |

\* cited by examiner

TRANSMISSION AND POWER SYSTEM FOR USE IN HYBRID VEHICLE

TECHNICAL FIELD

The present invention relates to the technical field of hybrid vehicles, and in particular, to a transmission and a power system for use in hybrid vehicles.

BACKGROUND OF THE INVENTION

At present, the use of petrol-electric hybrid power as a vehicle power source has increasingly become the mainstream trend of vehicle development. A hybrid vehicle usually includes an engine with a smaller displacement than a traditional engine and one or two electric motors. Under normal circumstances, when driving at low speeds (such as urban roads) or when frequent starting is required, the vehicle can be driven only by the electric motor; when high-speed driving is required, the vehicle can be driven only by the engine to save energy. In the prior art, the hybrid mode of a petrol-electric hybrid vehicle mainly includes three modes: series, parallel and hybrid.

The structure of the power system in the existing hybrid vehicle is relatively simple and has poor adaptability.

SUMMARY OF THE INVENTION

An object of the present invention is to provide a transmission for use in a hybrid vehicle with a simple structure but strong adaptability.

A further object of the present invention is to enable the transmission to provide a relatively large reduction ratio, and effectively reduce the size of the electric motor or improve the acceleration performance of the vehicle.

Another further object of the present invention is to simplify the power system of the hybrid vehicle, provide a relatively large reduction ratio, and effectively reduce the size of the electric motor or improve the acceleration performance of the vehicle.

In one aspect, the present invention provides a transmission for a hybrid vehicle. A first planetary gear mechanism, an input shaft, a first clutch, a second clutch and a brake are arranged in a casing of the transmission;

the first planetary gear mechanism comprises a first sun gear, a first planetary gear set, a first ring gear and a first planetary frame, the first sun gear is fixed on the input shaft so that the first sun gear rotates with the input shaft, either the first ring gear or the first planetary frame is in driving connection with an output gear of the transmission as an output member;

when one of the two components of the first ring gear and the first planetary frame is drivingly connected with the output gear, the other component is connected to the casing of the transmission through the brake; the second clutch is configured such that when the brake is disengaged, the second clutch is engaged to make the rotational speed of the output member equal to the rotational speed of the input shaft.

Optionally, when the first ring gear is drivingly connected with the output gear, the brake is arranged between the first planetary frame and the casing of the transmission, and the second clutch is arranged between the first ring gear and the input shaft or between the first ring gear and the first planetary frame, wherein when the brake is engaged and the second clutch is disengaged, the first gear of the transmission is realized; when the second clutch is engaged and the brake is disengaged, the second gear of the transmission is realized.

Optionally, when the first planetary frame is drivingly connected to the output gear, the brake is arranged between the first ring gear and the casing of the transmission, and the second clutch is arranged between the input shaft and the first planetary frame or between the input shaft and the first ring gear, wherein when the brake is engaged and the second clutch is disengaged, the first gear of the transmission is realized; when the second clutch is engaged and the brake is disengaged, the second gear of the transmission is realized.

In another aspect, the present invention also provides a power system for a hybrid vehicle. The power system includes an engine, a first electric motor, a second electric motor, a first planetary gear mechanism, an input shaft, a first clutch, a second clutch, and a brake;

the engine is connected to the first electric motor, the first clutch is arranged between the first electric motor and the input shaft to cut off or combine the power transmission between the first electric motor and the input shaft through the first clutch; the second electric motor is drivingly connected with the input shaft for driving the input shaft to rotate;

the first planetary gear mechanism comprises a first sun gear, a first planetary gear set, a first ring gear and a first planetary frame, the first sun gear is fixed on the input shaft so that the first sun gear rotates with the input shaft, either the first ring gear or the first planetary frame is drivingly connected with the output gear of the power system as an output member;

when one of the two components of the first ring gear and the first planetary frame is drivingly connected with the output gear, the other component is connected to a casing of the power system through the brake; the second clutch is configured such that when the brake is disengaged, the second clutch is engaged to make the rotational speed of the output member equal to the rotational speed of the input shaft.

Optionally, when the first ring gear is drivingly connected with the output gear, the brake is arranged between the first planetary frame and the casing of the power system, and the second clutch is arranged between the first ring gear and the input shaft or between the first ring gear and the first planetary frame, wherein when the brake is engaged and the second clutch is disengaged, the first gear of the power system is realized; when the second clutch is engaged and the brake is disengaged, the second gear of the power system is realized.

Optionally, when the first planetary frame is drivingly connected to the output gear, the brake is arranged between the first ring gear and the casing of the power system, and the second clutch is arranged between the input shaft and the first planetary frame or between the input shaft and the first ring gear, wherein when the brake is engaged and the second clutch is disengaged, the first gear of the power system is realized; when the second clutch is engaged and the brake is disengaged, the second gear of the power system is realized.

Optionally, the second electric motor is connected to the input shaft through a second planetary gear mechanism, the second planetary gear mechanism comprises a second sun gear, a second planetary gear set, a second ring gear and a second planetary frame.

Optionally, one of the three components of the second sun gear, the second ring gear and the second planetary frame is fixed relative to the casing of the power system, the rotor of the second electric motor is drivingly connected to one of the remaining two unfixed components to provide power thereto, and another unfixed component is drivingly connected to the input shaft to drive the input shaft.

In another aspect, the present invention also provides a transmission for a hybrid vehicle. The transmission includes a first planetary gear mechanism, a second planetary gear mechanism, an input shaft, a second clutch, a first brake and a second brake;

the first planetary gear mechanism comprises a first sun gear, a first planetary gear set, a first ring gear and a first planetary frame; the first sun gear is fixed on the input shaft so that the first sun gear rotates with the input shaft; the second planetary gear mechanism comprises a second sun gear, a second planetary gear set, a second ring gear and a second planetary frame; the second sun gear and the input shaft are independent of each other; wherein the second ring gear is fixedly connected to the first planetary frame, the first ring gear is fixedly connected to the second planetary frame, and the second planetary frame is used to transmit the power output by the transmission;

the first brake is arranged between the first planetary frame and a casing of the transmission, the second brake is arranged between the second sun gear and the casing of the transmission, and the second clutch is arranged between the second sun gear and the input shaft.

In another aspect, the present invention also provides a power system for a hybrid vehicle. The power system includes an engine, a first electric motor, a second electric motor, a first planetary gear mechanism, a second planetary gear mechanism, an input shaft, a first clutch, a second clutch, a first brake and a second brake;

the engine is connected to the first electric motor, the first clutch is arranged between the first electric motor and the input shaft to cut off or combine the power transmission between the engine and/or the first electric motor and the input shaft through the first clutch; the second electric motor is drivingly connected with the input shaft for driving the input shaft to rotate;

the first planetary gear mechanism comprises a first sun gear, a first planetary gear set, a first ring gear and a first planetary frame; the first sun gear is fixed on the input shaft so that the first sun gear rotates with the input shaft; the second planetary gear mechanism comprises a second sun gear, a second planetary gear set, a second ring gear and a second planetary frame; the second sun gear and the input shaft are independent of each other; wherein the second ring gear is fixedly connected to the first planetary frame, the first ring gear is fixedly connected to the second planetary frame, and the second planetary frame is used to transmit the power output by the power system;

the first brake is arranged between the first planetary frame and a casing of the power system, the second brake is arranged between the second sun gear and the casing of the power system, and the second clutch is arranged between the second sun gear and the input shaft.

Preferably, the second electric motor is connected to the input shaft through a third planetary gear mechanism, and the third planetary gear mechanism comprises a third sun gear, at least one set of planetary gear, a third ring gear, and a third planetary frame.

In the transmission and the power system of the present invention, the first ring gear or the first planetary frame is drivingly connected to the output gear of the transmission as an output member. When one of the two components of the first ring gear and the first planetary frame is drivingly connected to the output gear, another component is connected to the casing of the transmission through the brake; and the second clutch is configured such that when the brake is disengaged, the second clutch is engaged to make the rotational speed of the output member equal to the rotational speed of the input shaft. The transmission and the power system described above have a compact structure and a stable operation, to effectively improve the acceleration performance of the hybrid vehicle.

Further, the second electric motor of the present invention is connected with the input shaft through a planetary gear mechanism, which can provide a larger reduction ratio, effectively reduce the size of the electric motor or further improve the acceleration performance of the vehicle.

Based on the following detailed description of specific embodiments of the present invention in conjunction with the accompanying drawings, those skilled in the art will better understand the above and other objectives, advantages and features of the present invention.

BRIEF DESCRIPTION OF THE DRAWINGS

Hereinafter, some specific embodiments of the present invention will be described in detail in an exemplary but not restrictive manner with reference to the accompanying drawings. The same reference signs in the drawings indicate the same or similar components or parts. Those skilled in the art should understand that these drawings are not necessarily drawn to scale. In the drawings.

DETAILED DESCRIPTION OF PREFERRED EMBODIMENTS

Figure 1:
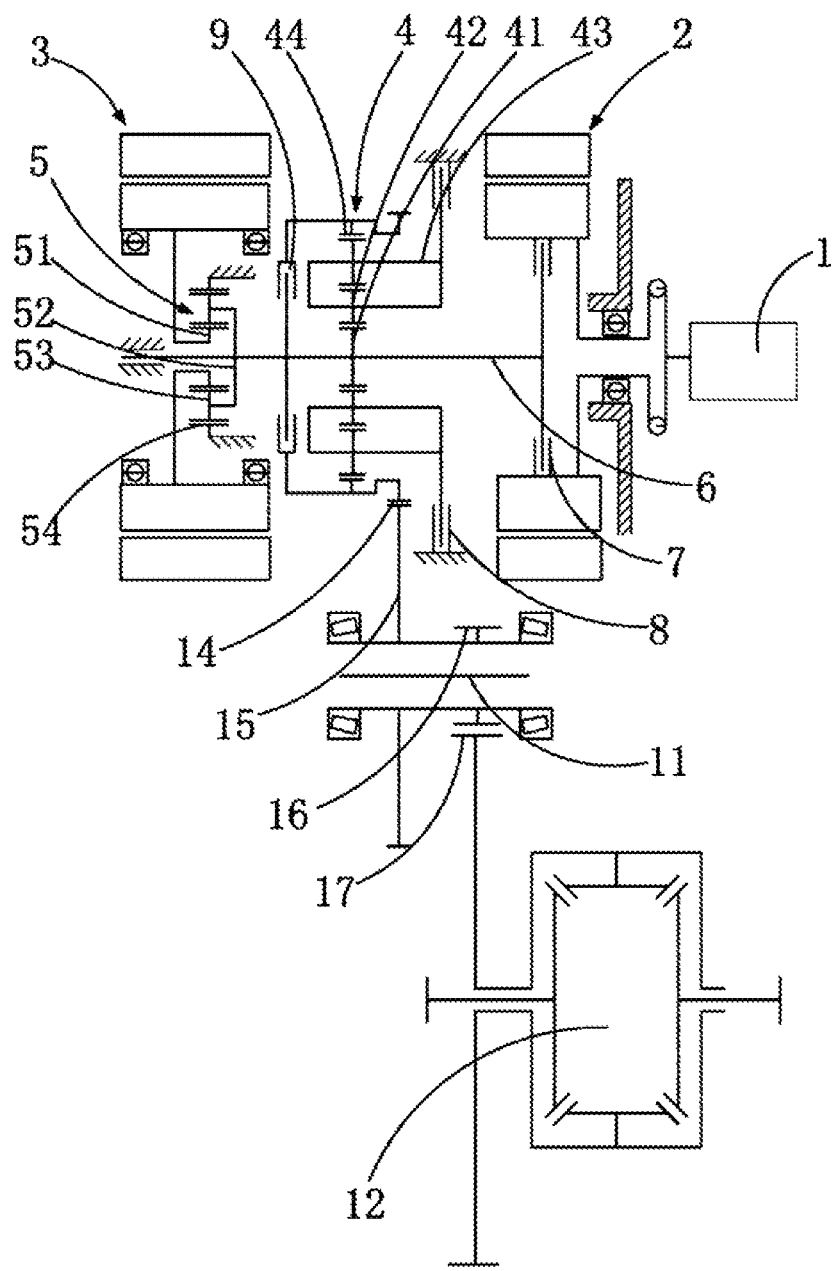
FIG. 1 is a schematic structural diagram of a power system according to a first embodiment of the present invention.

The transmission and the power system 100 according to the embodiments of the present invention will be described below with reference to FIGS. 1 to 5.

Referring to FIGS. 1 to 4, a transmission for a hybrid vehicle is provided. In the casing of the transmission, there are provided with a first planetary gear mechanism 4, an input shaft 6, a first clutch 7, a second clutch 9, and a brake 8. The first planetary gear mechanism 4 includes a first sun gear 41, a first planetary gear set 42, a first ring gear 44, and a first planetary frame 43. The first sun gear 41 is fixed on the input shaft 6 so that the first sun gear 41 rotates with the input shaft 6. The first ring gear 44 or the first planetary frame 43 is drivingly connected with the output gear 14 of the transmission as an output member. The first planetary gear set 42 may include one set of planetary gear set or multiple sets of planetary gear set. When one of the two components of the first ring gear 44 and the first planetary frame 43 is drivingly connected with the output gear 14, the other component is connected to the casing of the transmission through the brake 8; the second clutch 9 is configured such that when the brake 8 is disengaged, the second clutch 9 is engaged to make the rotational speed of the output member equal to the rotational speed of the input shaft 6.

The transmission can form a power system 100 with a first electric motor 2, a second electric motor 3, an engine 1, etc. Specifically, the power system 100 includes the engine 1, the first electric motor 2, the second electric motor 3, the first planetary gear mechanism 4, the input shaft 6, the first clutch 7, the second clutch 9, and the brake 8. Preferably, the first electric motor 2 is an integrated starter motor (ISG motor), and the second electric motor 3 is a high-power drive motor (TM motor). The first clutch 7, the second clutch 9 and the brake 8 are used to realize combination or cutting off of the transmission power of the power system 100. The engine 1, the first electric motor 2 and the second electric motor 3 may be arranged coaxially or non-coaxially.

The engine 1 is connected to the first electric motor 2. The crankshaft of the engine 1 is connected with the rotor of the first electric motor 2 through a shock absorber. The first clutch 7 is arranged between the first electric motor 2 and the input shaft 6 to cut off or combine the power transmission between the first electric motor 2 and the input shaft 6 through the first clutch 7. The first electric motor 2 has two functions, i.e., generating electricity and driving, and its structure and working principle have been described in detail in many related patents, and will not be repeated herein. By directly connecting the engine 1 with the first electric motor 2, the first electric motor 2 can start the engine 1, and the engine 1 can directly drive the first electric motor 2 to efficiently generate electricity. The electric energy of the first electric motor 2 is directly transmitted to the electric motor to drive, so as to reduce the conversion loss of electric energy to chemical energy.

The second electric motor 3 is drivingly connected with the input shaft 6 for driving the input shaft 6 to rotate. The second electric motor 3 may also be used as the first electric motor 2 to recover the braking energy of the vehicle. In order to improve gear transmission accuracy and improve NVH performance, the three prime movers (i.e., the engine 1, the first electric motor 2 and the second electric motor 3) are preferably arranged coaxially. Except for the differential 12, the entire transmission has only two shafts. Further, by connecting the engine 1 with the second electric motor 3 through the first clutch 7, when the second electric motor 3 is driving individually, the first clutch 7 is disengaged, so that the drag force of the engine 1 will not hinder the driving of the second electric motor 3, thereby improving the efficiency of motor driving.

The first planetary gear mechanism 4 includes a first sun gear 41, a first planetary gear set 42, a first ring gear 44, and a first planetary frame 43. The first sun gear 41 is fixed on the input shaft 6 so that the first sun gear 41 rotates with the input shaft 6. Specifically, the first sun gear 41 may be connected to the input shaft 6 through a spline connection. The first ring gear 44 or the first planetary frame 43 is drivingly connected with the output gear 14 of the power system 100 as an output member. When one of the two components of the first ring gear 44 and the first planetary frame 43 is drivingly connected with the output gear 14, the other component is connected to the casing of the power system 100 through the brake 8, and the engagement of the brake 8 can make the component stationary relative to the casing. The second clutch 9 is configured such that when the brake 8 is disengaged, the second clutch 9 is engaged to make the rotational speed of the output member equal to the rotational speed of the input shaft 6.

In order to obtain a larger reduction ratio, the second electric motor 3 and the second planetary gear mechanism 5 can be connected in different ways. In a preferred embodiment, the second planetary gear mechanism 5 includes a second sun gear 51, a second planetary gear set 53, a second ring gear 54, and a second planetary frame 52. Either one of the three components of the second sun gear 51, the second ring gear 54 and the second planetary frame 52 is fixed relative to the casing of the power system 100, the rotor of the second electric motor 3 is drivingly connected to one of the remaining two unfixed components to provide power thereto, and another unfixed component is drivingly connected to the input shaft 6 to drive the input shaft 6.

In a specific embodiment, the second sun gear 51 is fixed on the rotor of the second electric motor 3 and rotates with the rotor. The external gear of the second sun gear 51 meshes with the external gear of the second planetary gear set 53, the second planetary frame 52 is fixed to the input shaft 6, the external gear of the second planetary gear set 53 meshes with the internal gear of the second ring gear 54, the second ring gear 54 is fixed to the casing, and the power of the second electric motor 3 is transmitted to the input shaft 6 through the second planetary frame 52. This structure is suitable for a hybrid vehicle with a smaller power, smaller space and higher speed of the second electric motor 3. If the second electric motor 3 has a large power and a large battery power in a plug-in hybrid vehicle, the second planetary gear mechanism 5 connected with the second electric motor 3 can be omitted, in order to save costs.

Of course, those skilled in the art may understand that the power system 100 of the hybrid vehicle may further include, for example, a shock absorber between the engine 1 and the first electric motor 2, a differential 12 that achieves different speeds when the wheels turn, wheels for driving the vehicle, and driving axles for driving the wheels. The power system 100 may be directly connected to the above-mentioned elements in a conventional manner to realize the operation of the vehicle. These are not the focus of the technical solution of the present invention, and are well-known technologies to those skilled in the art, and therefore, are not repeated in this specification. The specific connection modes and working principle of each element of the power system 100 will be described in detail in the following.

In the transmission and the power system 100 of the present invention, the first ring gear 44 or the first planetary frame 43 is drivingly connected with the output gear 14 of the transmission as an output member. When one of the two components of the first ring gear 44 and the first planetary frame 43 is drivingly connected to the output gear 14, the other component is connected to the casing of the transmission through the brake 8; and the second clutch 9 is configured such that when the brake 8 is disengaged, the second clutch 9 is engaged to make the rotational speed of the output member equal to the rotational speed of the input shaft 6. The transmission and the power system 100 described above have a compact structure and a stable operation, to effectively improve the acceleration performance of the hybrid vehicle.

Several embodiments of the present invention are specifically described below.

First Embodiment

FIG. 1 is a schematic structural diagram of a power system 100 according to a first embodiment of the present invention. As shown in FIG. 1, when the first ring gear 44 is drivingly connected with the output gear 14, the brake 8 is arranged between the first planetary frame 43 and the casing of the power system 100, and the second clutch 9 is arranged between the first ring gear 44 and the input shaft 6. When the brake 8 is engaged and the second clutch 9 is disengaged, the first gear of the power system 100 is realized; when the second clutch 9 is engaged and the brake 8 is disengaged, the second gear of the power system 100 is realized.

Specifically, the crankshaft of the engine 1 is connected with the rotor of the first electric motor 2 through a shock absorber. The rotor of the first electric motor 2 is connected to the input shaft 6 through the first clutch 7. The first sun gear 41 of the first planetary gear mechanism 4 is fixed to the input shaft 6. One side of the first planetary frame 43 is connected to the rolling drum of the brake 8, and the first planetary frame 43 can be braked when the brake 8 works. When the second clutch 9 is engaged and the brake 8 is disengaged, the input shaft 6 and the first ring gear 44 are connected together, and the transmission ratio is 1. The first ring gear 44 is used to output power, and the output gear 14 fixed to the first ring gear 44 meshes with a driven gear 15 on the intermediate shaft 11, so as to transmit the input power received by the first planetary gear mechanism 4 to the intermediate shaft 11 after changing the speed. The rotor of the second electric motor 3 is connected to the second sun gear 51 of the second planetary gear mechanism 5. The second sun gear 51 and the input shaft 6 are independent of each other. The second ring gear 54 of the second planetary gear mechanism 5 is fixed to the casing of the transmission. The second planetary frame 52 is fixed to the input shaft 6. The output member of the second planetary gear mechanism 5 is the second planetary frame 52. The second planetary gear mechanism 5 changes the speed of the driving motor (i.e., the second electric motor 3) and transmits it to the input shaft 6, and then changes the input speed through the first planetary gear mechanism 4 and transmits it to the intermediate shaft 11. The main reduction gear (i.e., the driving gear 16) on the intermediate shaft 11 then drives the differential ring gear 17 on the differential 12 to transmit the driving power of the engine 1 and the electric motors to the driving axles, to finally drive the vehicle to move.

The present invention has three prime movers: the engine 1, the first electric motor 2 and the second electric motor 3. The first electric motor 2 may also be used as a generator to start the engine 1. The second electric motor 3 may also be used as a motor to recover the braking energy of the vehicle. In order to improve gear transmission accuracy and improve NVH performance, the three prime movers may be arranged coaxially, so that in addition to the differential 12, the entire transmission has only two shafts.

The power system 100 of this embodiment can implement the following common functions:

(1) Starting and Charging of the Engine 1

Since the crankshaft of the engine 1 is directly connected to the rotor of the first electric motor 2, the engine 1 can be started by the rotation of the first electric motor 2. On the contrary, the operation of the engine 1 can drive the first electric motor 2 to charge the battery. Since the main function of the engine 1 is to generate electricity, and the speed of the first electric motor 2 is always the same as that of the engine 1, the high-efficiency speed zones of the engine 1 and the first electric motor 2 should be designed to be consistent with each other.

(2) Driving Individually by the Engine 1

When the engine 1 is operating, the first clutch 7 is engaged in order to transmit all or part of the power of the engine 1 to the input shaft 6. If the brake 8 is engaged, the first sun gear 41 on the input shaft 6 drives the first ring gear 44 through the first planetary gear mechanism 4. The first planetary gear mechanism 4 is a two-row planetary gear mechanism. The two-row planetary gear mechanism is adopted to ensure that the first sun gear 41 and the first ring gear 44 rotate in the same direction. The output gear 14 on the first ring gear 44 meshes with the driven gear 15 on the intermediate shaft 11 to transmit the power of the engine 1 to the intermediate shaft 11. The driving gear 16 on the intermediate shaft 11 meshes with the differential ring gear 17 on the differential 12 to drive the driving axles, so as to finally drive the wheels to move. When driven by the engine 1 alone, a certain power of the engine 1 can be allocated to charge the battery through the first electric motor 2. According to the operating conditions of the vehicle, the remaining power of the engine 1 can be allocated to the first electric motor 2, thereby improving fuel economy. At full throttle, the torque of the first electric motor 2 can be controlled to zero, so that all the power of the engine 1 can be allocated to the driving axles to ensure the acceleration performance during the starting stage of the vehicle.

In this embodiment, when the speed of the vehicle is relatively high, the brake 8 is released and the second clutch 9 is engaged, so that the transmission ratio of the first planetary gear mechanism 4 drops from about 3 in the first gear to 1 in the second gear. If the overall transmission ratio of the first gear is 9, then the transmission ratio of the second gear becomes 3, which can be used for high-speed cruising or efficient power generation.

(3) Driving Individually by the Driving Motor

The second clutch 9 is disengaged, and the second electric motor 3 is started. In the second planetary gear mechanism 5, the second ring gear 54 is fixed, and the rotor of the second electric motor 3 drives the second sun gear 51 to rotate. At this time, the output speed of the second planetary frame 52 drops to:

$$n_s/n_c = 1 + \alpha_1$$

wherein $n_s$ is the rotational speed of the second sun gear 51, which is also the rotational speed of the rotor of the second electric motor 3; $n_c$ is the output speed of the second planetary frame 52; $\alpha_1$ is the gear ratio of the second ring gear 54 to the second sun gear 51.

Generally, the value of $\alpha_1$ is set between 2 and 3. It can be seen from the above formula that the second planetary gear mechanism 5 reduces the speed of the second electric motor 3 by about 3 times, that is, the torque is increased by 3 times, thereby effectively reducing the size of the driving motor or improving the acceleration performance of the vehicle.

If different reduction ratios are required, the second planetary gear mechanism 5 may adopt different coupling modes. For example, the rotor of the second electric motor 3 is connected to the second ring gear 54, the second sun gear 51, or the second planetary frame 52 to output.

(4) Driving Simultaneously by the Engine 1 and the Driving Motor

The second electric motor 3 and the engine 1 are started simultaneously. The first clutch 7 is engaged, and the torque of the engine 1 is subtracted by the torque of the first electric motor 2 and then transmitted to the input shaft 6 through the first clutch 7. The torque of the second electric motor 3 is also superimposed on the input shaft 6 after being amplified by the second planetary gear mechanism 5. If the torque of the first electric motor 2 is controlled to be zero, the maximum input torque on the input shaft 6 is:

$$T_{in} = T_e + \alpha_1 * T_{P3}$$

wherein $T_e$ is the output torque of the engine 1; T $p_3$ is the output torque of the second electric motor 3; $T_1$ is the input torque, which is equivalent to twice the output torque of the ordinary engine 1, to ensure good acceleration performance of the vehicle.

(5) Shifting

When the engine 1 is driving, the first clutch 7 and the brake 8 are each engaged, so that the torque of the engine 1 is transmitted to the input shaft 6 through the first clutch 7. The first sun gear 41 of the first planetary gear mechanism 4 is an input gear, the first ring gear 44 is an output gear, and the transmission ratio of the two-row planetary gear mechanism 4 is $α_2$. $α_2$ is the gear ratio of the first ring gear 44 to the first sun gear 41. Generally, the value of $α_2$ is set between 2 and 3.

When the speed is higher than the set value, the brake 8 is released and the second clutch 9 is engaged. The first sun gear 41 of the first planetary gear mechanism 4 rotates at the same speed as the first ring gear 44, and the transmission ratio of the first planetary gear mechanism 4 drops to 1. It is assumed: $a=Z_{15}/Z_{14}$ (wherein a represents the gear ratio of the driven gear 15 to the output gear 14, Z represents the number of teeth of meshed gears); and $b=Z_{17}/Z_{16}$ (wherein b represents the gear ratio of the differential ring gear 17 to the driving gear 16, Z represents the number of teeth of meshed gears), then the product of the two is $i_d$, and $i_d=a*b$, which can be used to drive the vehicle to cruise at high speed or efficiently generate electricity. The total transmission ratio of the first gear is $i_d*α_2$, which can be used to assist the electric motor to start or accelerate.

When the second electric motor 3 is driving, only the brake 8 needs to be engaged to achieve the first gear. The total transmission ratio of the first gear is $i_d*α_2*α_1$. When the speed of the vehicle is high, the brake 8 is released and the second clutch 9 is engaged, and the transmission ratio of the first planetary gear mechanism 4 is 1. The total transmission ratio of the second gear is $i_d*α_1$.

(6) Vehicle Braking Energy Recovery

When the vehicle decelerates and brakes, the brake 8 is engaged, and the inertia of the vehicle is transmitted through the differential 12 and the intermediate shaft 11 to drag the first ring gear 44, the first sun gear 41, the input shaft 6, the second planetary frame 52, the second sun gear 51 and the rotor of the second electric motor 3 to generate electricity, thereby realizing the recovery of braking energy.

In summary, the power system 100 of this embodiment can at least realize several working modes as shown in the following table:

| modes | gear ICE | gear P3 | driving ICE | driving P1 | driving P3 | frictional elements C1 | frictional elements C2 | frictional elements B |
|---|---|---|---|---|---|---|---|---|
| engine starting | | | ✓ | | ✓ | | | |
| electric driving-urban | | 1 | | | ✓ | | | ✓ |
| electric driving-high speed | | 2 | | | ✓ | | ✓ | |
| engine driving-starting | 1 | | ✓ | | | ✓ | | ✓ |
| engine driving-cruising | 2 | | ✓ | | | ✓ | ✓ | |
| generating electricity by engine | 2 | | ✓ | ✓ | | | | |
| electric power-assisted | 1 | 1 | ✓ | | ✓ | ✓ | | ✓ |
| braking energy recovery | | | | | ✓ | | | ✓ | wherein IGE refers to the engine 1, P1 refers to the first electric motor 2, P3 refers to the second electric motor 3, C1 refers to the first clutch 7, C2 refers to the second clutch 9, and B refers to the brake 8.

Second Embodiment

Figure 2:
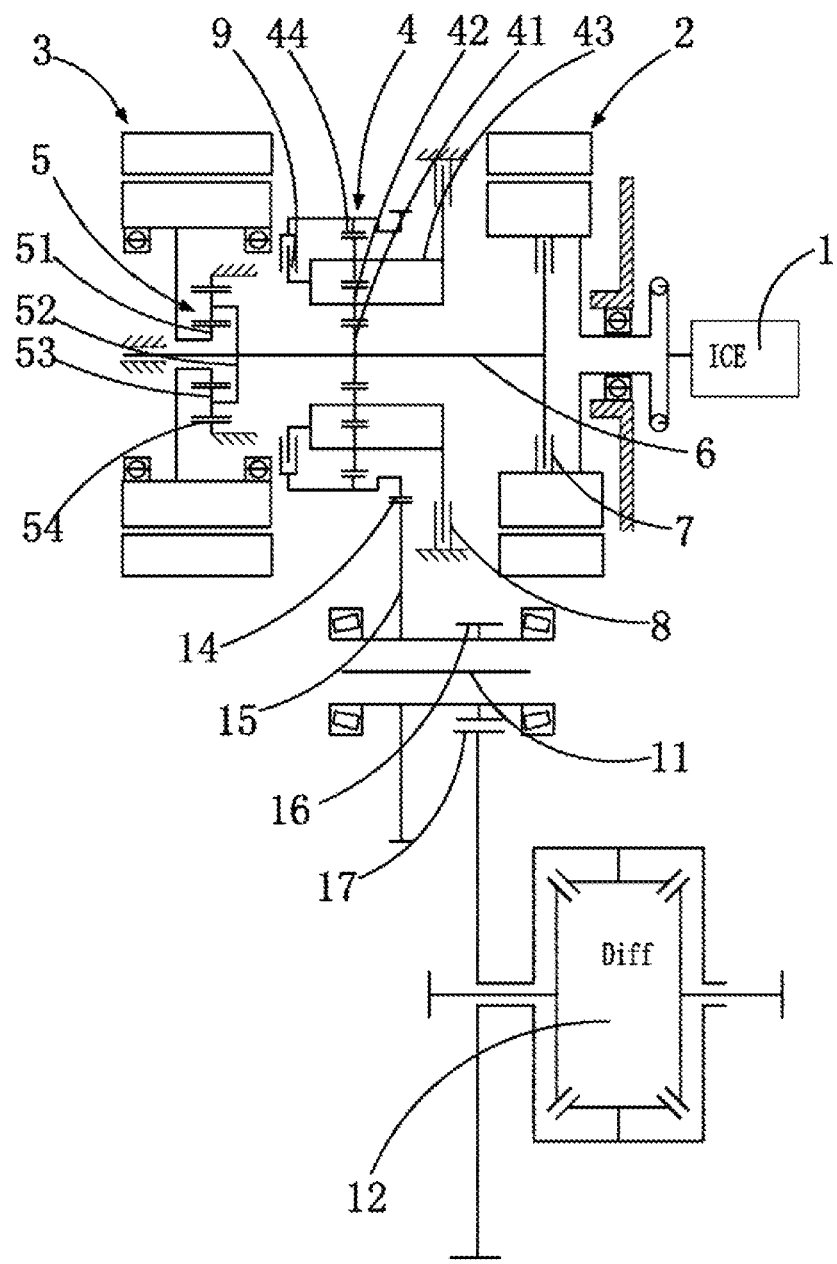
FIG. 2 is a schematic structural diagram of a power system according to a second embodiment of the present invention.

FIG. 2 is a schematic structural diagram of a power system 100 according to a second embodiment of the present invention. As shown in FIG. 2, when the first ring gear 44 is drivingly connected with the output gear 14, the brake 8 is arranged between the first planetary frame 43 and the casing of the power system 100, and the second clutch 9 is arranged between the first ring gear 44 and the first planetary frame 43. When the brake 8 is engaged and the second clutch 9 is disengaged, the first gear of the power system 100 is realized; when the second clutch 9 is engaged and the brake 8 is disengaged, the second gear of the power system 100 is realized.

The working principle of the power system 100 in this embodiment is basically the same as the working principle of the power system 100 in the first embodiment, except that the position of the second clutch 9 is different, and the way to achieve the second gear is different, which will not be described in detail herein.

Third Embodiment

Figure 3:
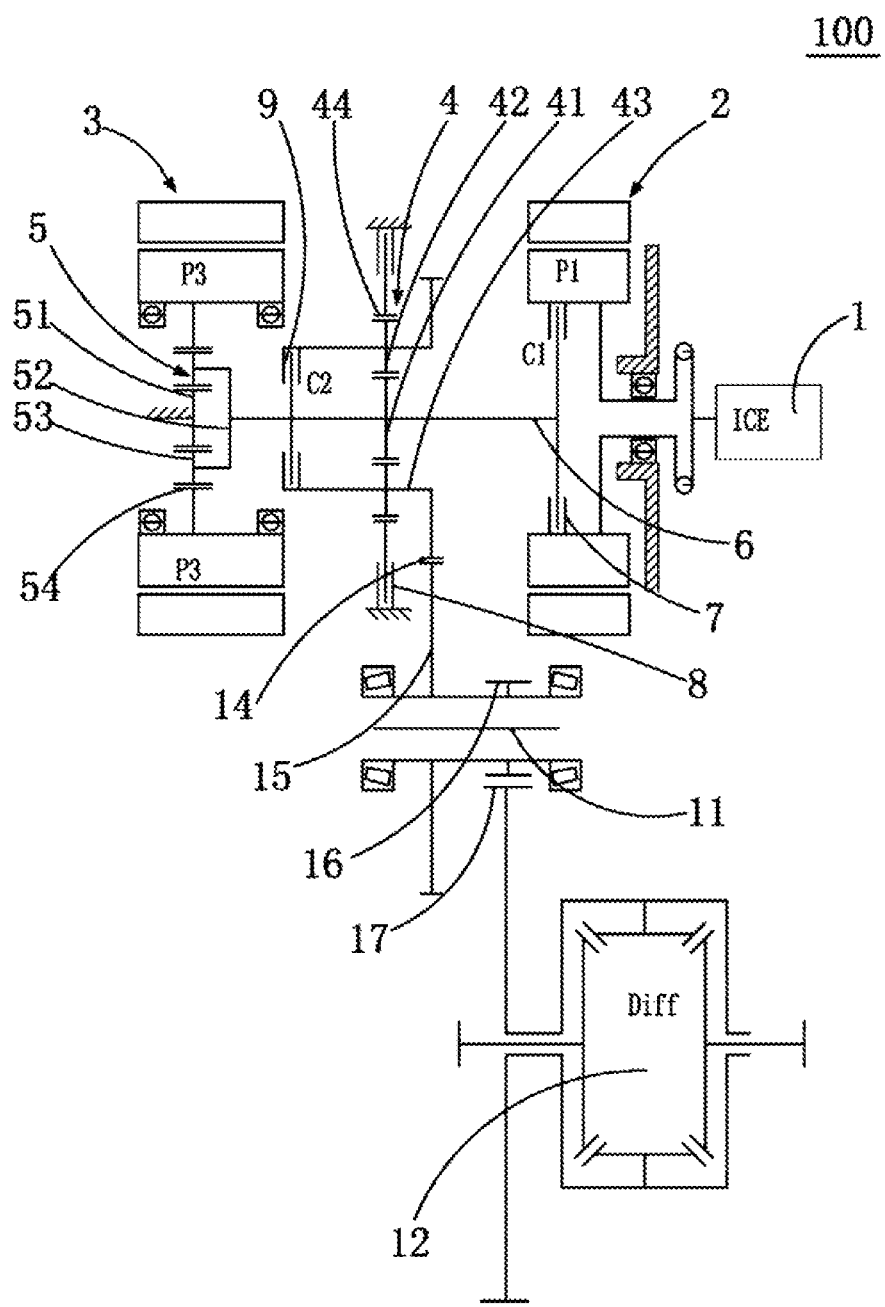
FIG. 3 is a schematic structural diagram of a power system according to a third embodiment of the present invention.

FIG. 3 is a schematic structural diagram of a power system 100 according to a third embodiment of the present invention. As shown in FIG. 3, when the first planetary frame 43 is drivingly connected with the output gear 14, the brake 8 is arranged between the first ring gear 44 and the casing of the power system 100, and the second clutch 9 is arranged between the input shaft 6 and the first planetary frame 43. When the brake 8 is engaged and the second clutch 9 is disengaged, the first gear of the power system 100 is realized; when the second clutch 9 is engaged and the brake 8 is disengaged, the second gear of the power system 100 is realized. In this embodiment, since the first planetary frame 43 is used to output power, the first planetary gear set 42 is a single planetary gear set.

Fourth Embodiment

Figure 4:
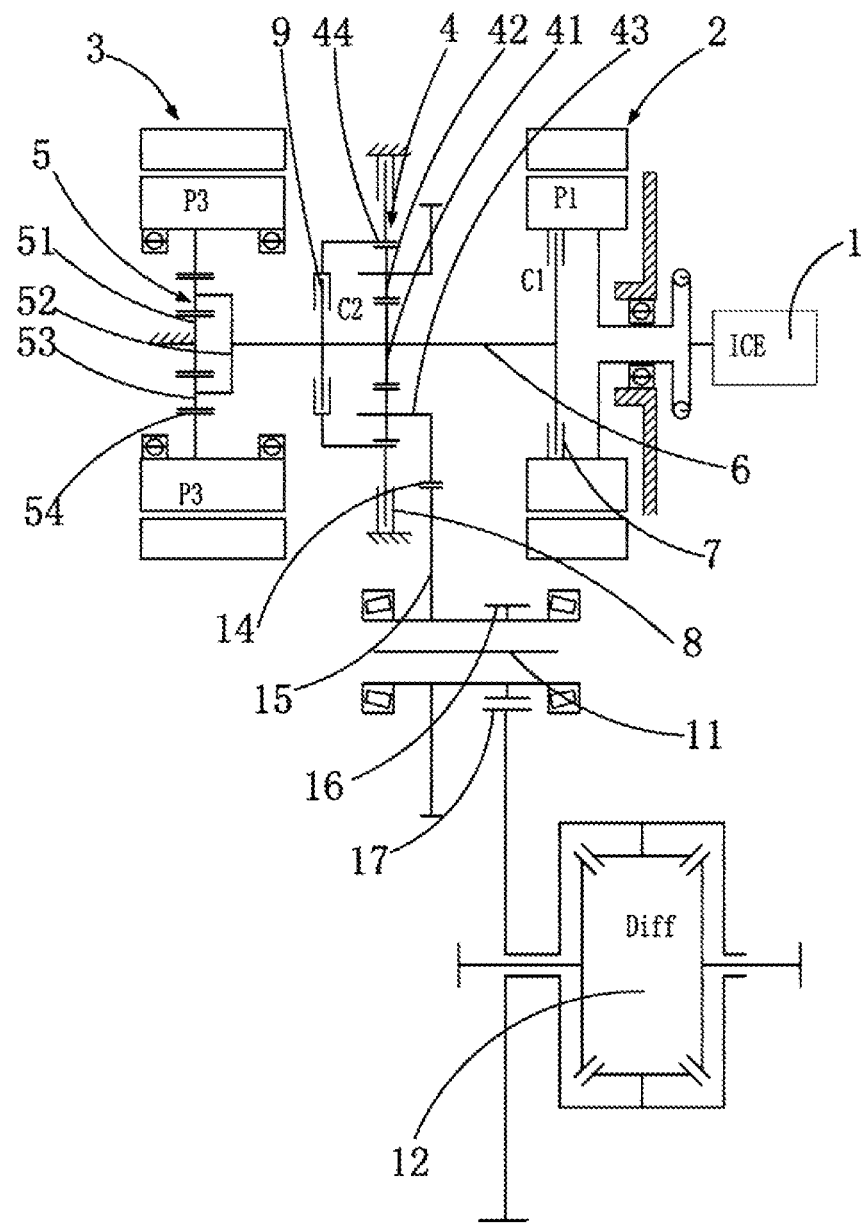
FIG. 4 is a schematic structural diagram of a power system according to a fourth embodiment of the present invention.

FIG. 4 is a schematic structural diagram of a power system 100 according to a fourth embodiment of the present invention. As shown in FIG. 4, when the first planetary frame 43 is drivingly connected with the output gear 14, the brake 8 is arranged between the first ring gear 44 and the casing of the power system 100, and the second clutch 9 is arranged between the input shaft 6 and the first ring gear 44. When the brake 8 is engaged and the second clutch 9 is disengaged, the first gear of the power system 100 is realized; when the second clutch 9 is engaged and the brake 8 is disengaged, the second gear of the power system 100 is realized. In this embodiment, since the first planetary frame 43 is used to output power, the first planetary gear set 42 is a single planetary gear set.

Fifth Embodiment

Figure 5:
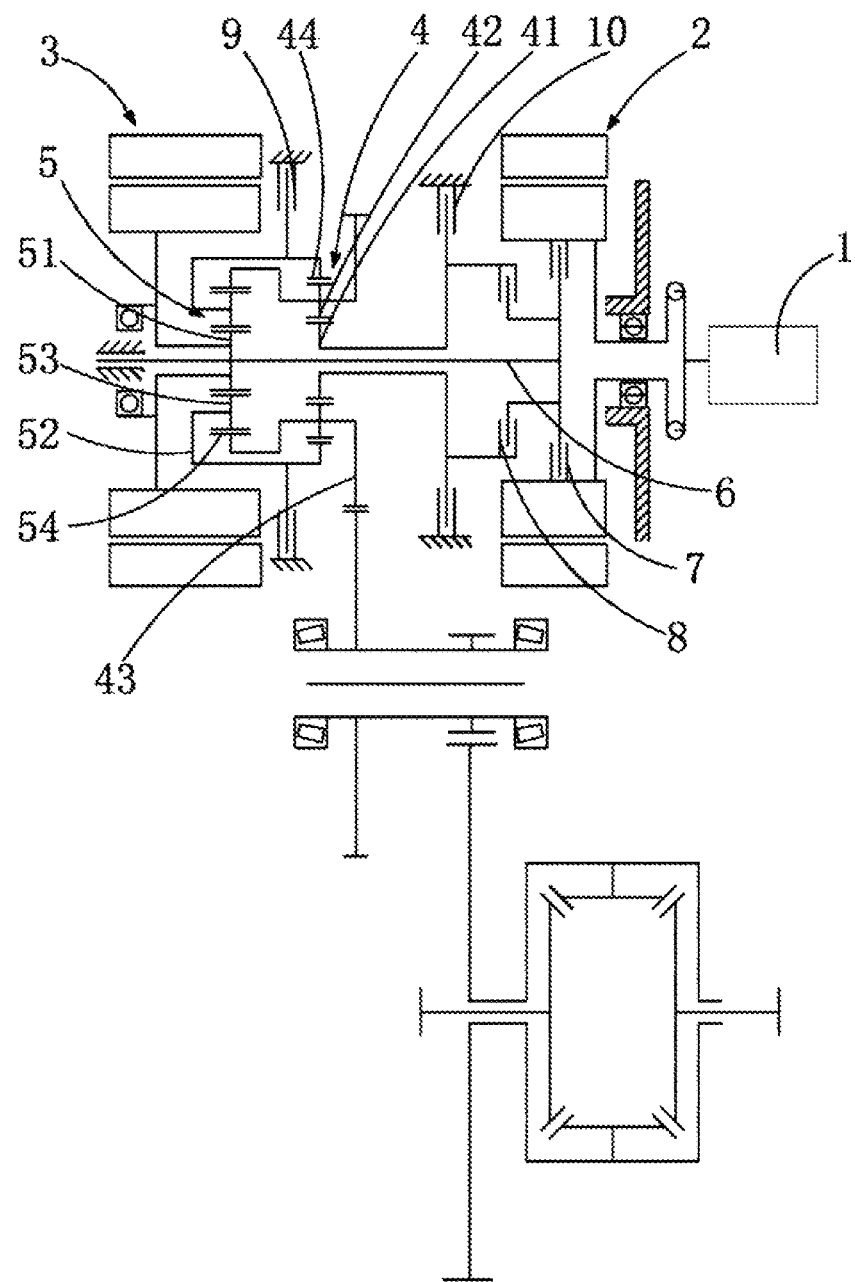
FIG. 5 is a schematic structural diagram of a power system according to a fifth embodiment of the present invention.

FIG. 5 is a schematic structural diagram of a power system 100 according to a fifth embodiment of the present invention. As shown in FIG. 5, a transmission for a hybrid vehicle includes a first planetary gear mechanism 5, a second planetary gear mechanism 4, an input shaft 6, a second clutch 8, a first brake 9, and a second brake 10. The first planetary gear mechanism 5 includes a first sun gear 51, a first planetary gear set 53, a first ring gear 54, and a first planetary frame 52. The first sun gear 51 is fixed on the input shaft 6 so that the first sun gear 51 rotates with the input shaft 6. The second planetary gear mechanism 4 includes a second sun gear 41, a second planetary gear set 42, a second ring gear 44, and a second planetary frame 43. The second sun gear 41 and the input shaft 6 are independent of each other. The second ring gear 44 is fixedly connected to the first planetary frame 52. The first ring gear 54 is fixedly connected to the second planetary frame 43. The second planetary frame 43 is used to transmit the power output by the transmission. The first brake 9 is arranged between the first planetary frame 52 and the casing of the transmission, the second brake 10 is arranged between the second sun gear 41 and the casing of the transmission, and the second clutch 8 is arranged between the second sun gear 41 and the input shaft 6.

Continuing to refer to FIG. 5, a power system for a hybrid vehicle is also provided. The power system 100 includes an engine 1, a first electric motor 2, a second electric motor 3, a first planetary gear mechanism 5, a second planetary gear mechanism 4, an input shaft 6, a first clutch 7, a second clutch 8, a first brake 9, and a second brake 10.

The engine 1 is connected to the first electric motor 2. The first clutch 7 is arranged between the first electric motor 2 and the input shaft 6 to cut off or combine the power transmission between the engine 1 and/or the first electric motor 2 and the input shaft 6 through the first clutch 7. The second electric motor 3 is drivingly connected with the input shaft 6 for driving the input shaft 6 to rotate. The first planetary gear mechanism 5 includes a first sun gear 51, a first planetary gear set 53, a first ring gear 54, and a first planetary frame 52. The first sun gear 51 is fixed on the input shaft 6 so that the first sun gear 51 rotates with the input shaft 6. The second planetary gear mechanism 4 includes a second sun gear 41, a second planetary gear set 42, a second ring gear 44, and a second planetary frame 43. The second sun gear 41 and the input shaft 6 are independent of each other. The second ring gear 44 is fixedly connected to the first planetary frame 52. The first ring gear 54 is fixedly connected to the second planetary frame 43. The second planetary frame 43 is used to transmit the power output by the power system. The first brake 9 is arranged between the first planetary frame 52 and the casing of the power system. The second brake 10 is arranged between the second sun gear 41 and the casing of the power system. The second clutch 8 is arranged between the second sun gear 41 and the input shaft 6.

The transmission or the power system with the above structure can realize three gear modes of the vehicle. The details are as follows. When the second brake 10 is engaged and the first brake 9 and the second clutch 8 are each disengaged, the second sun gear 41 is fixedly connected to the casing of the power system through the engagement of the second brake 10, and the power is transmitted to the output gear by the second planetary frame 43, such that the power system has a first transmission ratio, i.e., the first gear, which can be used to assist the electric motor to start or accelerate. When the first brake 9 is engaged and the second brake 10 and the second clutch 8 are each disengaged, the first planetary frame 52 and the second ring gear 44 are fixedly connected to the casing of the power system, and the power is transmitted to the output gear by the second planetary frame 43, such that the power system has a second transmission ratio, i.e., the second gear. When the second clutch 8 is engaged and the first brake 9 and the second brake 10 are each disengaged, the second sun gear 41 rotates with the input shaft 6 at the same speed. At this time, the two sun gears 51, 41 rotate together with the input shaft 6, it is equivalent to locking the interior of the first planetary gear mechanism 5, and the final transmission ratio of the power system is irrelevant to the first planetary gear mechanism 5, to realize the third gear, which can be used to drive the vehicle to cruise at high speed or efficiently generate electricity. Regarding the operating modes of the power system, the principle is basically the same as that in the first embodiment, and will not be detailed herein.

Further, in a preferred embodiment, the second electric motor 3 is connected to the input shaft 6 through a third planetary gear mechanism, and the third planetary gear mechanism includes a third sun gear, at least one set of planetary gear, a third ring gear, and a third planetary frame. One of the three components of the third sun gear, the third ring gear and the third planetary frame is fixed relative to the casing of the power system, the rotor of the second electric motor 3 is drivingly connected to one of the unfixed components to provide power thereto, and another unfixed component is drivingly connected to the input shaft 6 to drive the input shaft 6.

Further, the hybrid vehicle adopting the power system of the present invention may further be provided with, for example, a lithium battery energy storage system, a battery management system for managing the energy storage system, etc. In this way, the power of the second electric motor 3 and the first electric motor 2 can be directly supplied through the lithium battery energy storage system, and the first electric motor 2 can charge the lithium battery energy storage system through the engine 1. These are not the focus of the present invention, and will not be repeated herein.

So far, those skilled in the art should realize that although several exemplary embodiments of the present invention have been illustrated and described in detail herein, many other variations or modifications can be made according to the content disclosed without departing from the spirit and scope of the present invention. Therefore, the scope of the present invention should be understood and deemed to cover all these other variations or modifications.

What is claimed is:

1. A transmission for a hybrid vehicle, wherein a first planetary gear mechanism, an input shaft, a first clutch, a second clutch and a brake are arranged in a casing of the transmission;

the first planetary gear mechanism comprises a first sun gear, a first planetary gear set, a first ring gear and a first planetary frame, the first sun gear is fixed on the input shaft so that the first sun gear rotates with the input shaft, either the first ring gear or the first planetary frame is fixedly connected with an output gear of the transmission and serves as an output member of the first planetary gear mechanism;

when one of the two components of the first ring gear and the first planetary frame is fixedly connected with the output gear, the other component is connected to the casing of the transmission through the brake;

the second clutch is connected between the input shaft and one of the first ring gear and the first planetary frame or between the first ring gear and the first planetary frame, and is configured such that when the brake is disengaged, the second clutch is engaged to make the rotational speed of the output member equal to the rotational speed of the input shaft;

the transmission further comprises an intermediate shaft, a driven gear and a driving gear both of which are fixedly provided on the intermediate shaft, and a differential ring gear provided on a differential, wherein the output gear meshes with the driven gear to transmit power from the output member to the intermediate shaft, the driving gear meshes with the differential ring gear to transmit power from the intermediate shaft to the differential;

the first ring gear is fixedly connected with the output gear, the brake is connected between the first planetary frame and the casing of the transmission, and the second clutch is connected between the first ring gear and the input shaft, or the first planetary frame is fixedly connected to the output gear, the brake is connected between the first ring gear and the casing of the transmission, and the second clutch is connected between the input shaft and the first planetary frame, or the first planetary frame is fixedly connected to the output gear, the brake is connected between the first ring gear and the casing of the transmission, and the second clutch is connected between the input shaft and the first ring gear;

when the brake is engaged and the second clutch is disengaged, first gear of the transmission is realized; when the second clutch is engaged and the brake is disengaged, second gear of the transmission is realized.

2. A power system for a hybrid vehicle, wherein the power system comprises an engine, a first electric motor, a second electric motor, a first planetary gear mechanism, an input shaft, a first clutch, a second clutch, and a brake;

a crankshaft of the engine is connected to a rotor of the first electric motor, the first clutch is connected between the rotor of the first electric motor and the input shaft to cut off or combine the power transmission between the first electric motor and the input shaft through the first clutch; the second electric motor is drivingly connected with the input shaft for driving the input shaft to rotate;

the first planetary gear mechanism comprises a first sun gear, a first planetary gear set, a first ring gear and a first planetary frame, the first sun gear is fixed on the input shaft so that the first sun gear rotates with the input shaft, either the first ring gear or the first planetary frame is fixedly connected with an output gear of the power system and serves as an output member of the first planetary gear mechanism;

when one of the two components of the first ring gear and the first planetary frame is fixedly connected with the output gear, the other component is connected to a casing of the power system through the brake;

the second clutch is connected between the input shaft and one of the first ring gear and the first planetary frame or between the first ring gear and the first planetary frame, and is configured such that when the brake is disengaged, the second clutch is engaged to make the rotational speed of the output member equal to the rotational speed of the input shaft;

the power system further comprises an intermediate shaft, a driven gear and a driving gear both of which are fixedly provided on the intermediate shaft, and a differential ring gear provided on a differential, wherein the output gear meshes with the driven gear to transmit power from the output member to the intermediate shaft, the driving gear meshes with the differential ring gear to transmit power from the intermediate shaft to the differential.

3. The power system for a hybrid vehicle according to claim 2, wherein the first ring gear is fixedly connected with the output gear, the brake is connected between the first planetary frame and the casing of the power system, and the second clutch is connected between the first ring gear and the input shaft, wherein when the brake is engaged and the second clutch is disengaged, first gear of the power system is realized; when the second clutch is engaged and the brake is disengaged, second gear of the power system is realized.

4. The power system for a hybrid vehicle according to claim 2, wherein the first planetary frame is fixedly connected to the output gear, the brake is connected between the first ring gear and the casing of the power system, and the second clutch is connected between the input shaft and the first planetary frame, wherein when the brake is engaged and the second clutch is disengaged, first gear of the power system is realized; when the second clutch is engaged and the brake is disengaged, second gear of the power system is realized.

5. The power system for a hybrid vehicle according to claim 2, wherein the second electric motor is connected to the input shaft through a second planetary gear mechanism, the second planetary gear mechanism comprises a second sun gear, a second planetary gear set, a second ring gear and a second planetary frame.

6. The power system for a hybrid vehicle according to claim 5, wherein one of the three components of the second sun gear, the second ring gear and the second planetary frame is fixed relative to the casing of the power system, a rotor of the second electric motor is fixedly connected to one of the remaining two unfixed components to provide power thereto, and another unfixed component is fixedly connected to the input shaft to drive the input shaft.

7. The power system for a hybrid vehicle according to claim 6, wherein the second sun gear is fixedly connected to the rotor of the second electric motor and rotates with the rotor of the second electric motor, the second planetary frame is fixedly connected to the input shaft, the second ring gear is fixedly connected to the casing of the power system, and the second electric motor transmits power to the input shaft through the second planetary frame.

8. The power system for a hybrid vehicle according to claim 6, wherein the second ring gear is fixedly connected to the rotor of the second electric motor and rotates with the rotor of the second electric motor, the second planetary frame is fixedly connected to the input shaft, the second sun gear is fixedly connected to the casing of the power system, and the second electric motor transmits power to the input shaft through the second planetary frame.

9. The power system for a hybrid vehicle according to claim 2, wherein the first ring gear is fixedly connected with the output gear, the brake is connected between the first planetary frame and the casing of the power system, and the second clutch is connected between the first ring gear and the first planetary frame, wherein when the brake is engaged and the second clutch is disengaged, first gear of the power system is realized; when the second clutch is engaged and the brake is disengaged, second gear of the power system is realized.

10. The power system for a hybrid vehicle according to claim 2, wherein the first planetary frame is fixedly connected to the output gear, the brake is connected between the first ring gear and the casing of the power system, and the second clutch is connected between the input shaft and the first ring gear, wherein when the brake is engaged and the second clutch is disengaged, first gear of the power system is realized; when the second clutch is engaged and the brake is disengaged, second gear of the power system is realized.

11. The power system for a hybrid vehicle according to claim 2, wherein the engine, the first electric motor and the second electric motor are arranged coaxially.

12. A power system for a hybrid vehicle, wherein the power system comprises an engine, a first electric motor, a second electric motor, a first planetary gear mechanism, a second planetary gear mechanism, an input shaft, a first clutch, a second clutch, a first brake and a second brake;

a crankshaft of the engine is connected to a rotor of the first electric motor, the first clutch is connected between the rotor of the first electric motor and the input shaft to cut off or combine the power transmission between the engine and/or the first electric motor and the input shaft through the first clutch;

the first planetary gear mechanism comprises a first sun gear, a first planetary gear set, a first ring gear and a first planetary frame; the first sun gear is fixed on the input shaft so that the first sun gear rotates with the input shaft; a rotor of the second electric motor is fixedly connected to the first sun gear such that the second electric motor is drivingly connected with the input shaft for driving the input shaft to rotate; the second planetary gear mechanism comprises a second sun gear, a second planetary gear set, a second ring gear and a second planetary frame; the second sun gear and the input shaft are independent of each other; wherein the second ring gear is fixedly connected to the first planetary frame, the first ring gear is fixedly connected to the second planetary frame, and the second planetary frame is used to transmit the power output by the power system;

the first brake is connected between the first planetary frame and a casing of the power system, the second brake is connected between the second sun gear and the casing of the power system, and the second clutch is connected between the second sun gear and the input shaft.

13. The power system for a hybrid vehicle according to claim 12, wherein the second electric motor is connected to the input shaft through a third planetary gear mechanism, and the third planetary gear mechanism comprises a third sun gear, at least one set of planetary gear, a third ring gear, and a third planetary frame.

14. The power system for a hybrid vehicle according to claim 12, wherein the second planetary frame is fixedly connected with an output gear, the power system further comprises an intermediate shaft, a driven gear and a driving gear both of which are fixedly provided on the intermediate shaft, and a differential ring gear provided on a differential, wherein the output gear meshes with the driven gear to transmit power from the second planetary frame to the intermediate shaft, the driving gear meshes with the differential ring gear to transmit power from the intermediate shaft to the differential.

* * * * *